(12) United States Patent
McVey et al.

(10) Patent No.: US 8,693,882 B2
(45) Date of Patent: Apr. 8, 2014

(54) ELECTRONIC DISPERSION COMPENSATION SYSTEMS AND METHODS

(75) Inventors: James D. McVey, Palo Alto, CA (US); Charles Steven Joiner, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 786 days.

(21) Appl. No.: 11/755,636

(22) Filed: May 30, 2007

(65) Prior Publication Data

US 2009/0016737 A1  Jan. 15, 2009

Related U.S. Application Data

(60) Provisional application No. 60/804,209, filed on Jun. 8, 2006.

(51) Int. Cl.
*H03H 7/30* (2006.01)
*H04B 10/12* (2011.01)

(52) U.S. Cl.
USPC ........... 398/147; 398/140; 398/141; 398/136; 375/229; 375/232

(58) Field of Classification Search
USPC ......................................... 398/147, 140, 141
See application file for complete search history.

(56) References Cited

U.S. PATENT DOCUMENTS

| | | | | |
|---|---|---|---|---|
| 5,712,942 | A * | 1/1998 | Jennings et al. | 385/134 |
| 7,180,751 | B1 * | 2/2007 | Geschke et al. | 361/788 |
| 2002/0181573 | A1 * | 12/2002 | Dohmen et al. | 375/229 |
| 2003/0142929 | A1 * | 7/2003 | Bartur et al. | 385/92 |
| 2004/0022303 | A1 * | 2/2004 | Tonietto et al. | 375/219 |
| 2004/0076113 | A1 * | 4/2004 | Aronson et al. | 370/217 |
| 2004/0120352 | A1 * | 6/2004 | Jungerman | 370/503 |
| 2004/0247238 | A1 | 12/2004 | Argon et al. | |
| 2004/0258183 | A1 | 12/2004 | Popescu et al. | |
| 2005/0078779 | A1 | 4/2005 | Lenosky | |
| 2005/0078963 | A1 | 4/2005 | Lenosky | |
| 2006/0008279 | A1 * | 1/2006 | Chiang et al. | 398/202 |
| 2006/0015790 | A1 * | 1/2006 | Bansal | 714/752 |
| 2006/0067699 | A1 * | 3/2006 | Chandrasekhar et al. | 398/147 |
| 2006/0095222 | A1 * | 5/2006 | Reintjes et al. | 702/106 |
| 2006/0110170 | A1 * | 5/2006 | Wang | 398/208 |
| 2007/0009260 | A1 | 1/2007 | Bothwell et al. | |
| 2007/0025436 | A1 * | 2/2007 | Shumarayev et al. | 375/233 |

OTHER PUBLICATIONS

Intel, Intel Technology Journal, Optical Technologies and Applications, vol. 8 Issue 2 Published May 10, 2004 ISSN 1535-864X, downloaded Nov. 10, 2005 from: http://www.intel.com/technology/itj/2004/volume08issue02/index.htm.

(Continued)

*Primary Examiner* — Oommen Jacob
(74) *Attorney, Agent, or Firm* — Maschoff Brennan (57) ABSTRACT

An electronic dispersion compensation module may perform one or more electronic dispersion compensation solutions. The electronic dispersion compensation module may include a solution control module. The solution control module may configure the electronic dispersion compensation module to perform an electronic dispersion compensation solution using data indicating a bit error rate. A bit error rate module may create the data indicating a bit error rate. The bit error rate module may form part of a clock and data recovery module. The electronic dispersion compensation module may be configured to receive a signal from a backplane and may also be configured to apply any of a plurality of electronic dispersion compensation solutions to the signal received from the backplane.

20 Claims, 10 Drawing Sheets

(56) References Cited

OTHER PUBLICATIONS

Intel, 10 Gb/s Optical Transceivers: Fundamentals and Emerging Technologies, Electronic Dispersion Compensation, Intel Technology Journal, Optical Technologies and Applications, vol. 8 Issue 2 Published May 10, 2004 ISSN 1535-864X, downloaded Nov. 10, 2005 from: http://www.intel.com/technology/itj/2004/volume08issue02/art02_opttransceivers/p05_electdispersion.htm.

RP Photonics, Electronic dispersion compensation, Encyclopedia of Laser Physics and Technology, downloaded: Nov. 10, 2005 from: http://www.rp-photonics.com/electronic_dispersion_compensation.html.

International Application No. PCT/US2007/070274, International Search Report and Written Opinion of the International Searching Authority, mailed Mar. 25, 2008.

Office Action issued in the related Taiwan patent application No. 096120397 mailed Jan. 6, 2011.

* cited by examiner

Multimode Fiber 100

(PRIOR ART)

FIGURE 1

(PRIOR ART)

FIGURE 2

Single Mode Fiber 110

(PRIOR ART)

FIGURE 3

(PRIOR ART)

ELECTRONIC DISPERSION COMPENSATION SYSTEMS AND METHODS

CROSS-REFERENCE TO RELATED APPLICATIONS

This application claims priority to and the benefit of U.S. provisional patent application Ser. No. 60/804,209, entitled ELECTRONIC DISPERSION COMPENSATION SYSTEMS AND METHODS and filed Jun. 8, 2006, the disclosure of which is incorporated by reference in its entirety.

BACKGROUND OF THE INVENTION

1. Field of the Invention

The invention generally relates to the transmission of signals in communication systems. More specifically, the invention relates to systems and methods of mitigating the effects of dispersion in communication systems.

2. Background Technology

In the field of data transmission, one method of efficiently transporting data is through the use of fiber-optics. Digital data is propagated through a fiber-optic cable using light emitting diodes or lasers. To send data on a fiber-optic cable, the data is typically converted from electronic data generated by computers to optical data that can be propagated onto the fiber-optic cable. This conversion is generally done using a laser or light emitting diode. When light is generated (or is at "high power") a logical "1" is presented. The absence of light (or light at "low power") represents a logical "0". Thus an optical signal with sharp rising transitions and falling transitions representing logical "1" and "0" bits is transmitted onto the fiber-optic cable.

Figure 1:
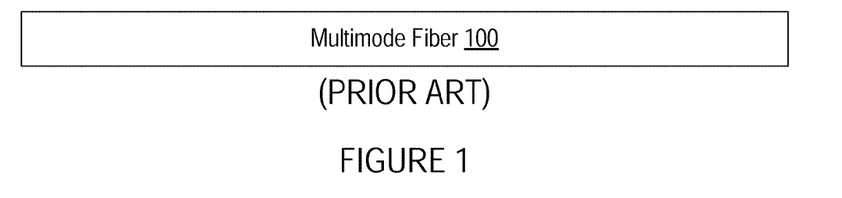
FIG. 1 is a diagram of a prior art optical fiber.
Figure 2:
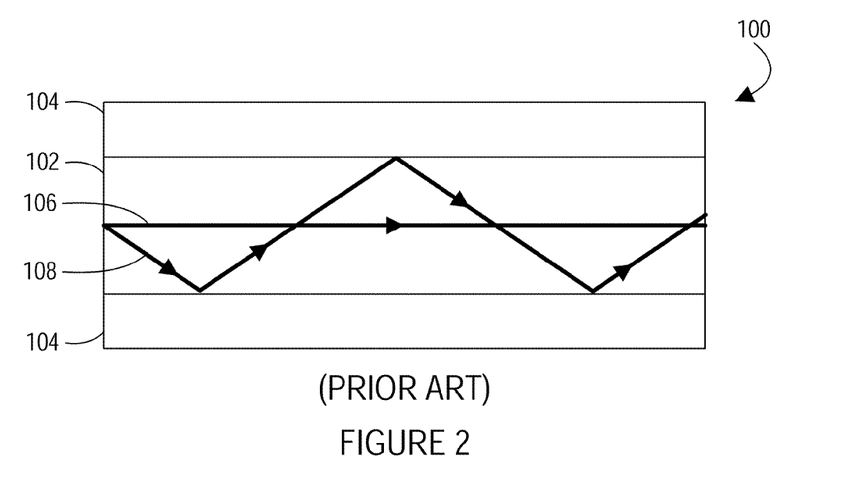
FIG. 2 is a cross sectional diagram of the prior art optical fiber shown in FIG. 1.

Much of the fiber-optic cable presently installed is multi-mode fiber, such as a multi-mode fiber 100 shown in FIGS. 1 and 2. As shown in FIGS. 1 and 2, the multi-mode fiber 100 typically includes a core 102 surrounded by a cladding 104.

With multi-mode fiber, signals travel through different paths along the multi-mode fiber 100. For example, one or more portions 106 of a signal may travel directly down the multi-mode fiber 100 while other portions 108 of the signal "bounce" or are reflected back and forth along the fiber-optic cable. For portions of the signal that are reflected back and forth, each portion may take a different path resulting in different velocities at which the portions of the signal travel through the multi-mode fiber 100.

When a single signal takes several paths as it travels along the multi-mode fiber 100, the signal may disperse, which may cause portions of adjacent bits to disperse into each other (commonly referred to as "intersymbol interference"). For example, portions of a "1" or high power bit may spread into the time of the signal previously occupied by a "0" or low power bit. Similarly, the absence of power in a "0" or low power bit may cause a decrease in the power of an adjacent "1" or high power bit at various times within the time of the signal previously occupied by a "1" bit. Signal dispersion is more severe as the distances that the signals travel is increased and also as the frequency at which the signals are transmitted increases.

As dispersion takes place, the high and low thresholds are blurred. The more blurring that takes place, the more difficult it is to interpret data bits. Consequently, some of the data bits embedded in the signals may be erroneously interpreted. While it is expected that some erroneous interpretations of data bits may occur, most communication standards specify a maximum number of erroneous interpretations that may occur. This is usually specified as the maximum bit error rate. For example, the maximum bit error rate in 10 Gigabit Ethernet systems is $10^{-12}$. To the extent that dispersion causes more errors than a specified maximum bit error rate, the effects of the dispersion should be mitigated.

Figure 3:
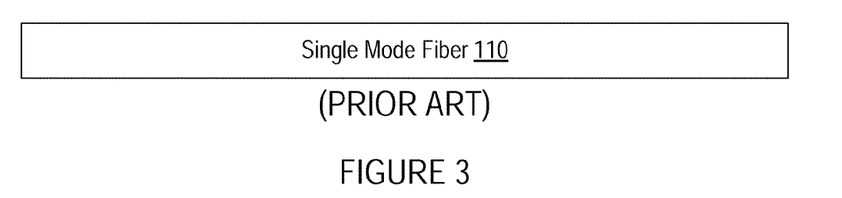
FIG. 3 is a diagram of another prior art optical fiber.
Figure 4:
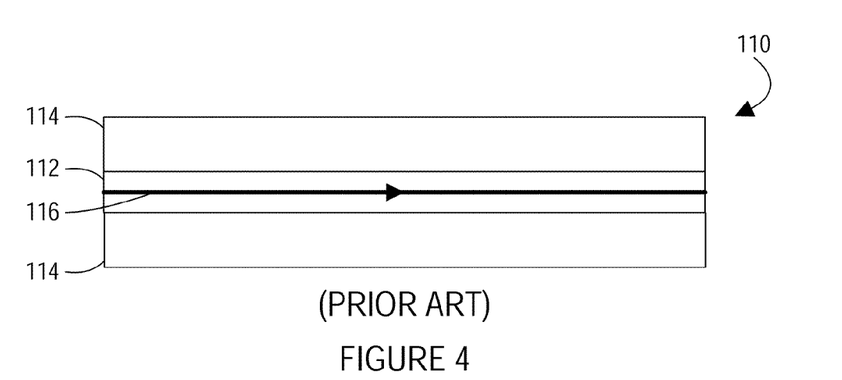
FIG. 4 is a cross sectional diagram of the prior art optical fiber shown in FIG. 3.

One attempt to mitigate the effects of dispersion involves using single mode fiber, such as a single mode fiber 110 shown in FIGS. 3 and 4. As shown in FIGS. 3 and 4, the single mode fiber 110 typically includes a core 112 surrounded by a cladding 114. Advantageously, the single mode fiber 110 is configured to transmit a signal directly down the single mode fiber 110, which helps to mitigate the effects of dispersion. Unfortunately, installing single mode fiber may be more difficult, more time consuming, and/or more expensive than installing multi-mode fiber. Further, replacing existing multi-mode fiber with single mode fiber may also be difficult, expensive and time consuming. Moreover, as data rates increase, dispersion may occur with single mode fiber.

One attempt to mitigate the effects of dispersion involves using electronic dispersion compensation circuits. Unfortunately, such circuits may apply electronic dispersion compensation solutions that can get stuck in an undesirable local minimum. For example, the electronic dispersion compensation circuits may incrementally change the electronic dispersion compensation solutions and then determine whether the incremental changes yield better or worse results. If a worse result occurs, the electronic dispersion compensation circuit may return to a prior solution. In some instances, the prior solution may be less than desirable, but the electronic dispersion compensation circuit may always return to the prior solution because the incremental changes yield worse results.

Dispersion may occur in optical-based communication systems and also in other communication systems. For example, dispersion may occur in electrical based communication systems, such as those using copper or other conductor-based transmission lines.

BRIEF SUMMARY OF EMBODIMENTS OF THE INVENTION

A need therefore exists for systems and methods that eliminate or diminish the disadvantages and problems listed above and/or other disadvantages and problems.

One aspect is an electronic dispersion compensation system that may comprise a clock and data recovery module that may include a bit error rate module configured to create first data indicating a bit error rate. The electronic dispersion compensation system may also comprise an electronic dispersion compensation module configured to perform a first electronic dispersion compensation solution. The electronic dispersion compensation module may include a solution control module configured to receive the first data and to use the first data in determining whether to configure the electronic dispersion compensation module to perform a second electronic dispersion compensation solution.

One aspect is an electronic dispersion compensation system that may comprise an electronic dispersion compensation module. The electronic dispersion compensation module may be configured to perform a first electronic dispersion compensation solution. The electronic dispersion compensation module may include a solution control module configured to receive first data and to use the first data in determining whether to configure the electronic dispersion compensation module to perform a second electronic dispersion compensation solution. The first data may indicate a bit error rate. The first data may be created by a bit error rate module of a clock and data recovery module.

One aspect is an electronic dispersion compensation system that may comprise a clock and data recovery module. The clock and data recovery module may include a bit error rate module configured to create first data indicating a bit error rate. The clock and data recovery module may be configured to send the first data to an electronic dispersion compensation module. The electronic dispersion compensation module may be configured to perform a first electronic dispersion compensation solution. The electronic dispersion compensation module may include a solution control module configured to receive the first data and to use the first data in determining whether to configure the electronic dispersion compensation module to perform a second electronic dispersion compensation solution.

One aspect is an electronic dispersion compensation system that may comprise an electronic dispersion compensation module. The electronic dispersion compensation module may be configured to receive a signal from a backplane. The electronic dispersion compensation module may also be configured to apply any of a plurality of electronic dispersion compensation solutions to the signal.

For purposes of summarizing, some aspects, advantages and features of some embodiments of the invention have been described in this summary. Not necessarily all of (or any of) these summarized aspects, advantages or features will be embodied in any particular embodiment of the invention. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which.

DETAILED DESCRIPTION OF THE PREFERRED EMBODIMENTS

Certain embodiments of the invention relate generally to electronic dispersion compensation systems and methods. However, the disclosed embodiments of systems and methods may be used in other contexts unrelated to electronic dispersion compensation.

Figure 5:
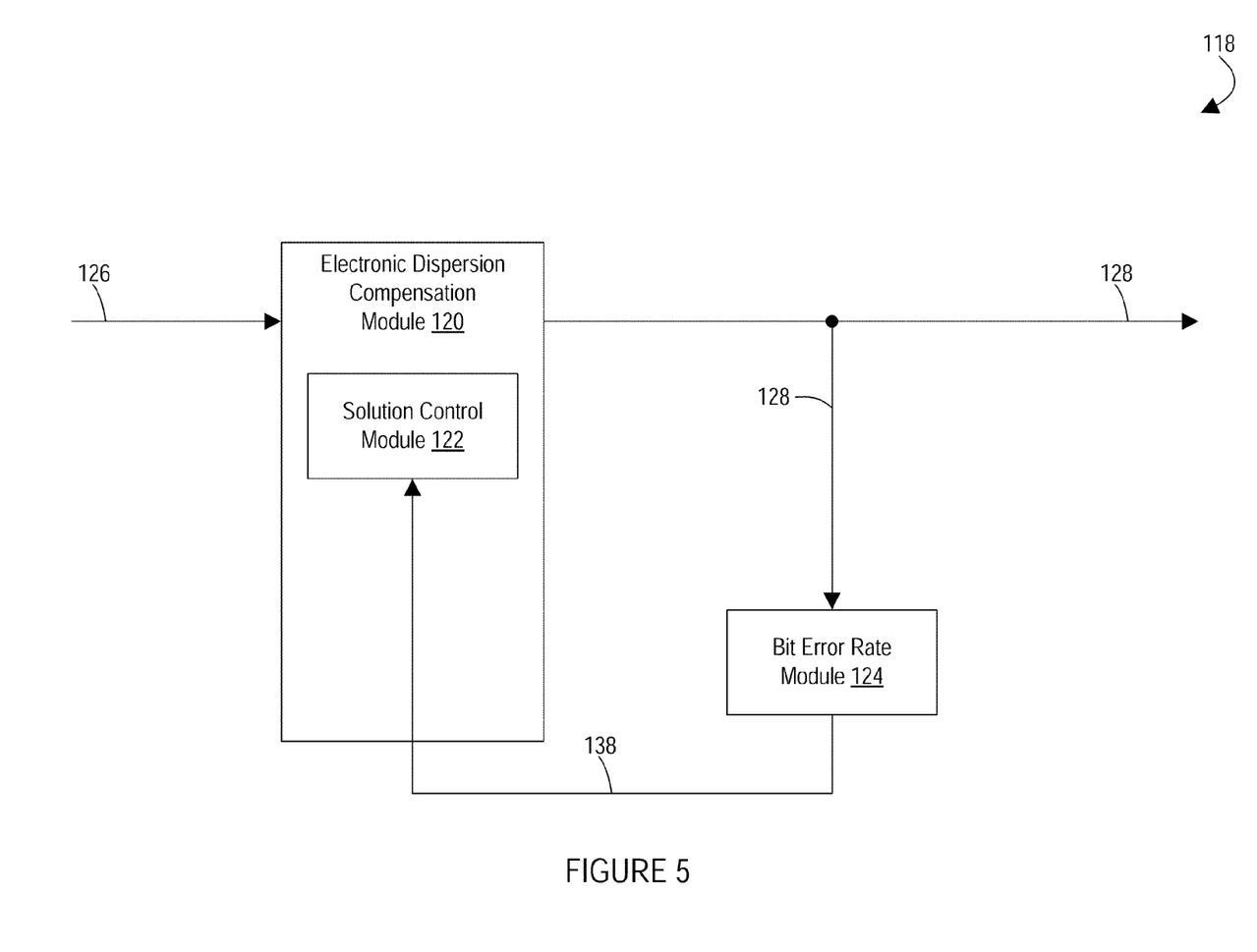
FIG. 5 is a diagram of an exemplary electronic dispersion compensation system.

As shown in FIG. 5, an electronic dispersion compensation system 118 may include an electronic dispersion compensation module 120, such as an electronic dispersion compensation (EDC) circuit. The electronic dispersion compensation circuit may be implemented in a single chip, multiple chips, one or more other suitable structures or any combination thereof The electronic dispersion compensation module 120 may include a solution control module 122. The electronic dispersion compensation system 118 may also include a bit error rate module 124.

The electronic dispersion compensation module 120 may receive a signal 126 and may apply one or more electronic dispersion compensation solutions to the signal 126 to create a signal 128. The signal 126 may be an electrical signal, an optical signal or any other suitable signal, and the signal 128 may be an electrical signal, an optical signal or any other suitable signal. In one embodiment, the signal 126 is an electrical signal, which may have been converted into the electrical signal 126 from an optical signal, and the signal 128 may be an electrical signal that may be transmitted to any suitable destination.

The electronic dispersion compensation solutions that the electronic dispersion compensation module 120 applies to the signal 126 may advantageously help mitigate the effects of intersymbol interference. One skilled in the art will appreciate that the electronic dispersion compensation module 120 may apply any of a variety of electronic dispersion compensation solutions, including those already created and those that will be created in the future. Accordingly, it will be appreciated that the electronic dispersion compensation module 120 does not require any particular electronic dispersion compensation solution.

Figure 6:
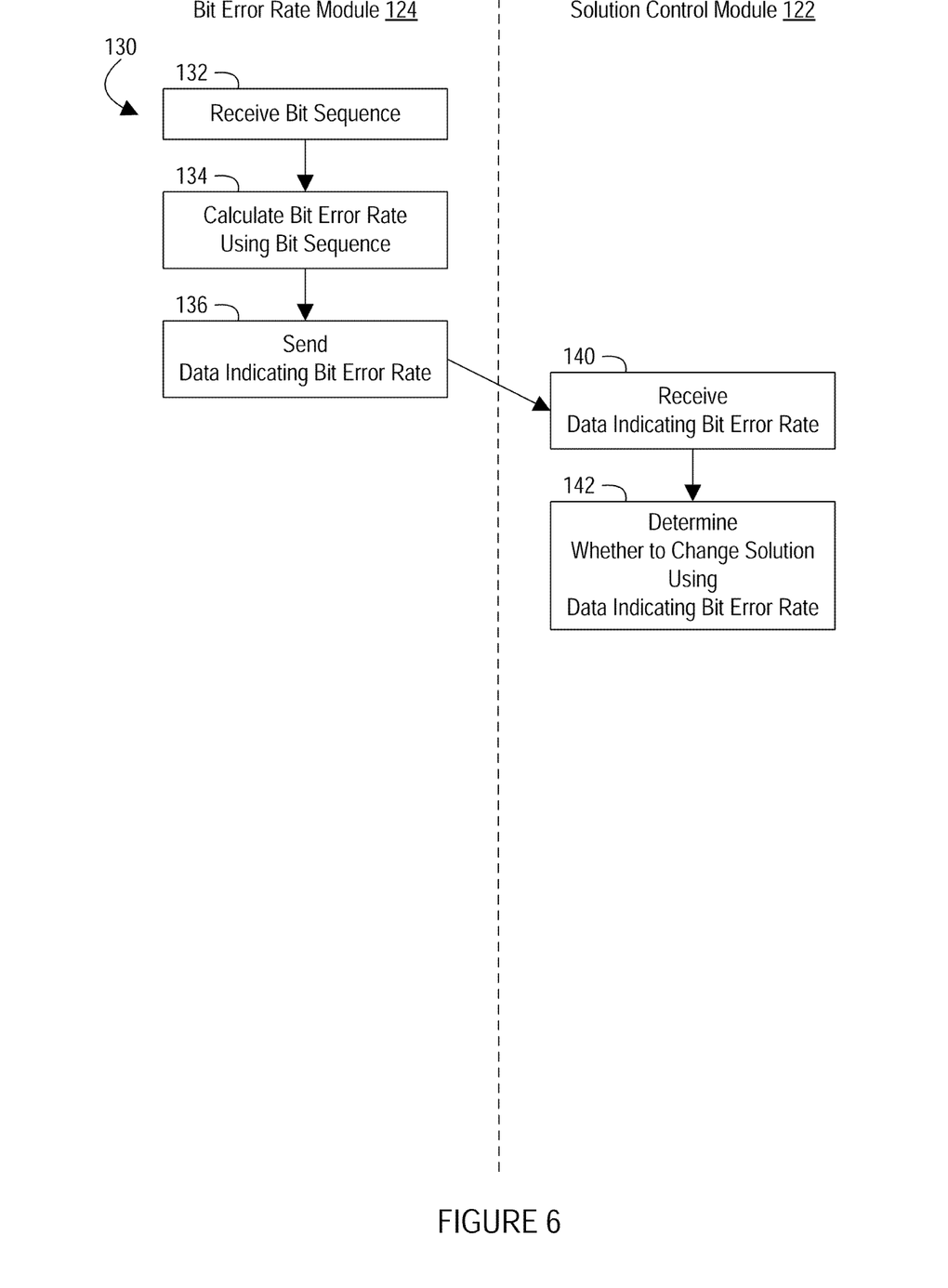
FIG. 6 is a flow chart of an exemplary electronic dispersion compensation method.

As shown in FIG. 6, the bit error rate module 124 and the solution control module 122 preferably may perform some or all of a method 130; however, some or all of the method 130 may be performed by the bit error rate module 124; the solution control module 122; one or more other suitable modules, systems, and the like; or any suitable combination of one or more thereof. Of course, the entire method 130 need not be performed; and any part or parts of the method 130 may be performed to provide a useful method 130.

As shown in FIG. 6, at a block 132, the bit error rate module 124 may receive a bit sequence via, for example, the signal 126 (FIG. 5). At a block 134, the bit error rate module 124 may calculate a bit error rate using the bit sequence.

In one embodiment, the bit sequence may include an algorithmically-defined pattern of one or more bits that is sent at regular intervals. In particular, a data communications protocol may provide an algorithm that defines the pattern. For example, the bit sequence may be coded using "66-64" coding in which an algorithmically-defined pattern of two framing bits (e.g., "a '1' followed by a '0'") separate every 64 bits of payload. In this embodiment, the bit error rate module 124 may, at the block 134, calculate the bit error rate by testing the algorithmically-defined pattern. To identify the position of the algorithmically-defined pattern in the bit sequence, the bit error rate module may test various positions in the bit sequence to identify how often each position creates matches to the expected pattern. Given that many of the bits may be random (such as the payload), the position of the algorithmically-defined pattern should create significantly more matches than other positions—allowing the bit error rate module to identify the position of the known pattern in the bit sequence and then calculate a bit error rate at the block 134.

At the block 136, the bit error rate module 124 may send data indicating the bit error rate to the solution control module 122 via, for example, a signal 138 (FIG. 5). At the block 140, the solution control module 122 may receive the data indicating the bit error rate. The data indicating the bit error rate may comprise, for example, a bit error rate value, data indicating that the bit error rate is greater than a value, data indicating that the bit error rate is greater than or equal to a value, data indicating that the bit error rate is less than a value, data indicating that the bit error rate is less than or equal to a value, or the like.

At the block 142, the solution control module 122 may use the data indicating the bit error rate to determine whether to change the electronic dispersion compensation solution that the electronic dispersion compensation module applies to the signal 126 to create the signal 128. For example, the solution control module 122 may change the electronic dispersion compensation solution when the data received at the block 140 indicates that the bit error rate has reached or exceeded a certain rate. By using the data received at the block 140 to determine whether to change the electronic dispersion compensation solution, the solution control module 122 may advantageously help determine when the currently used solution is stuck in an undesirable local minimum and then change to a new solution. It will be appreciated that the solution control module 122 may use the data indicating the bit error rate and/or other data in determining whether to change the electronic dispersion compensation solution.

Figure 7:
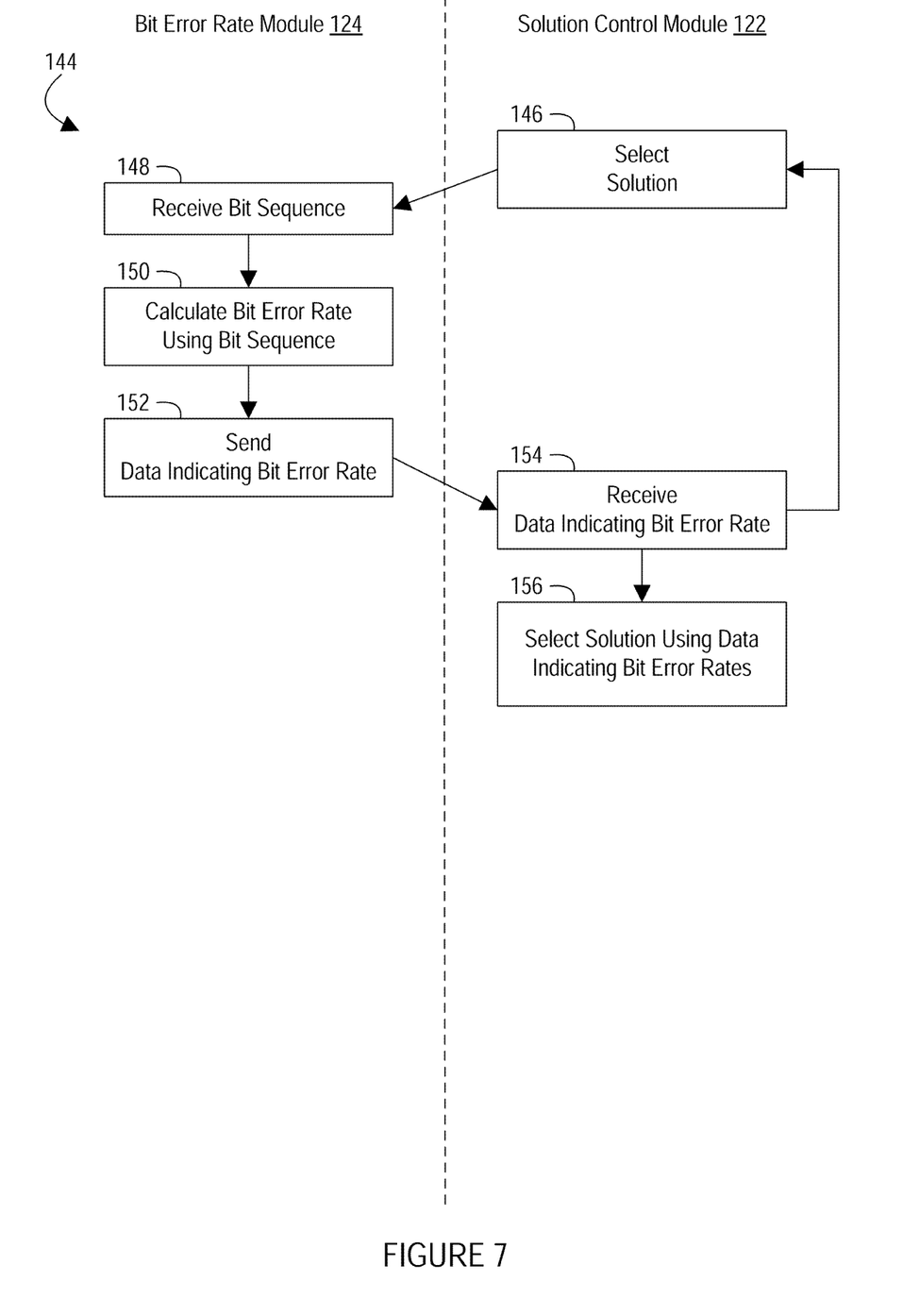
FIG. 7 is a flow chart of an exemplary electronic dispersion compensation method.

As shown in FIG. 7, the bit error rate module 124 and the solution control module 122 preferably may perform some or all of a method 144; however, some or all of the method 144 may be performed by the bit error rate module 124; the solution control module 122; one or more other suitable modules, systems, and the like; or any suitable combination of one or more thereof. Of course, the entire method 144 need not be performed; and any part or parts of the method 144 may be performed to provide a useful method 144. Desirably, the method 144 may be used to select an electronic dispersion compensation solution from a set of available electronic dispersion compensation solutions.

In greater detail, as shown in FIG. 7, at a block 146, the solution control module 122 may select an electronic dispersion compensation solution that the electronic dispersion compensation module 120 applies to the signal 126 to create the signal 128. At a block 148, the bit error rate module 124 may receive a bit sequence via, for example, the signal 128 (FIG. 5). At a block 150, the bit error rate module 124 may use the bit sequence to calculate a bit error rate associated with the solution that was selected at the block 146. At the block 152, the bit error rate module 124 may send data indicating the bit error rate to the solution control module 122 via, for example, the signal 138 (FIG. 5). At the block 154, the solution control module 122 may receive the data indicating the bit error rate.

As shown in FIG. 7, the blocks 146, 148, 150, 152, 154 may be repeated one more times so that the solution control module 122 may receive data indicating a plurality of bit error rates, each bit error rate being associated with a particular solution that was selected at the block 146.

At the block 156, the solution control module 122 may use the data indicating a plurality of bit error rates in selecting an electronic dispersion compensation solution that the electronic dispersion compensation module will apply to the signal 126 to create the signal 128. For example, the solution control module 122 may select the solution that had the lowest bit error rate of the solutions selected at the block 146. It will be appreciated that the solution control module 122 may use the data indicating a plurality of bit error rates and/or other data in selecting an electronic dispersion compensation solution.

Figure 8:
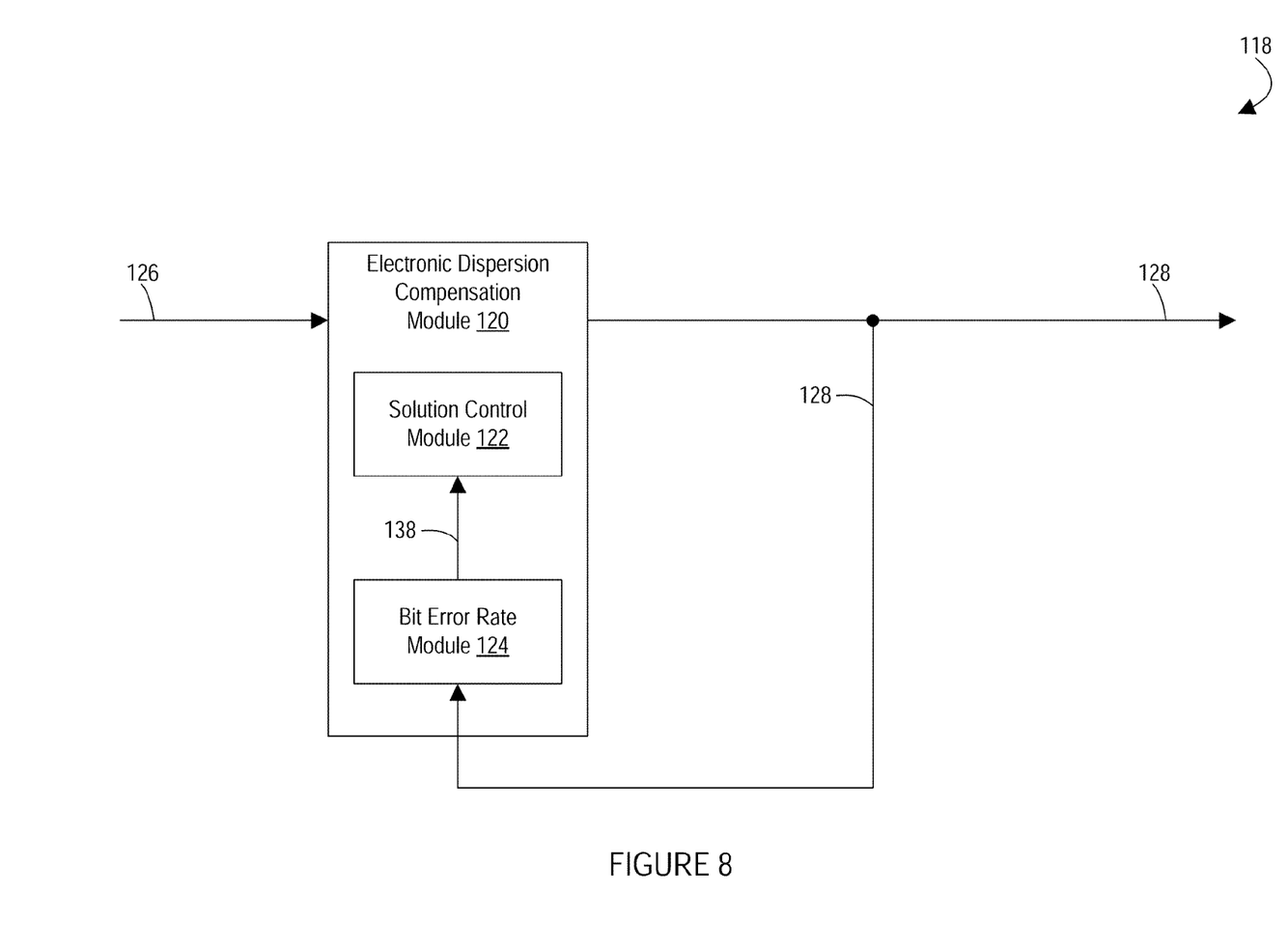
FIG. 8 is a diagram of another exemplary electronic dispersion compensation system.

The bit error rate module 124 may be implemented as part of the electronic dispersion compensation module 120, for instance as shown in FIG. 8. The bit error rate module 124, however, may be implemented separate from the electronic dispersion compensation module 120, for instance as shown in FIG. 5.

In some embodiments, the electronic dispersion compensation system 118 may include a receiver, a transmitter, and/or a transceiver, which may include the electronic dispersion compensation module 120 and bit error rate module 124 shown in FIG. 5 and in FIG. 8.

Figure 9:
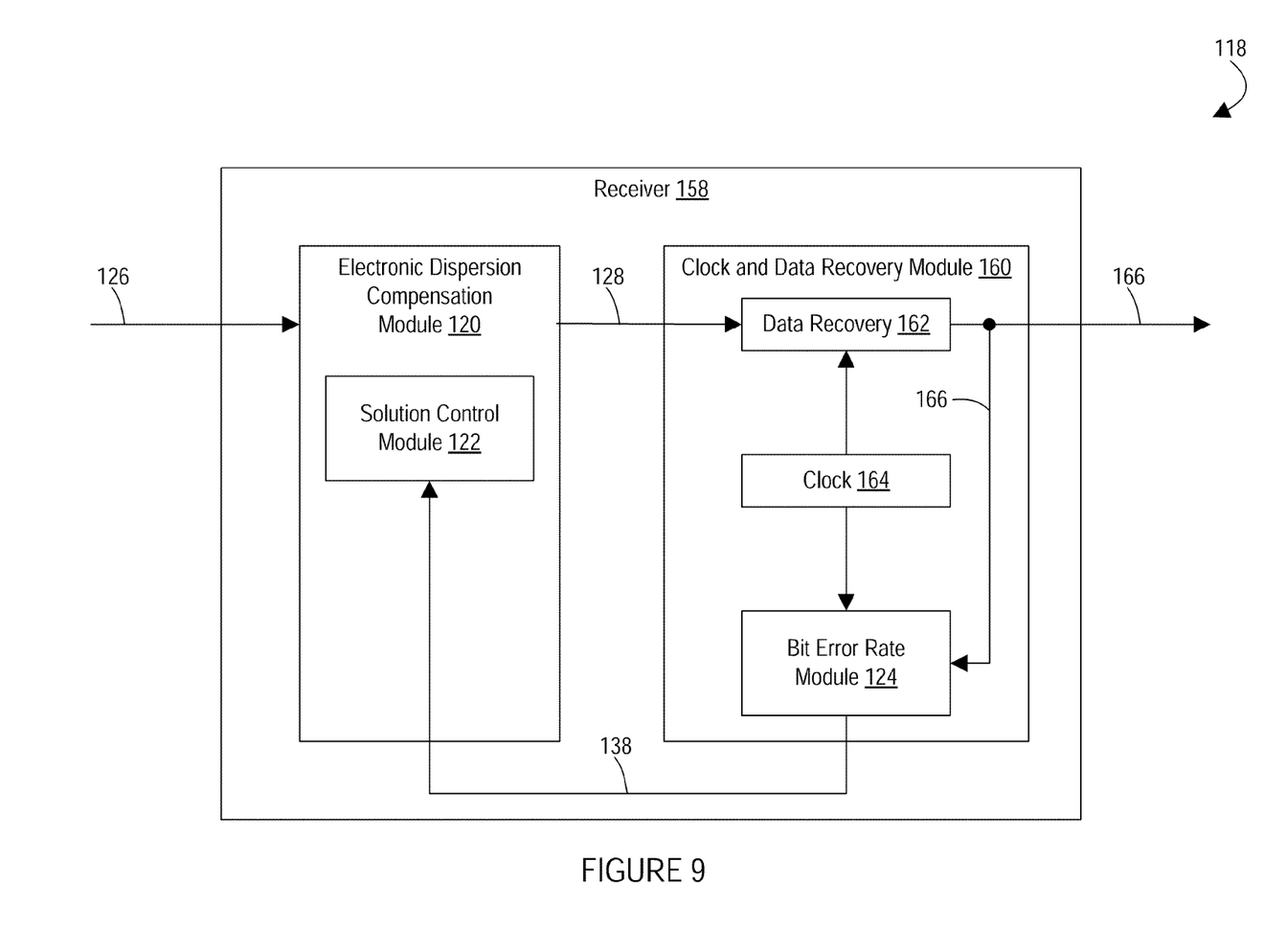
FIG. 9 is a diagram of yet another exemplary electronic dispersion compensation system.

For example, in an embodiment shown in FIG. 9, the electronic dispersion compensation system 118 may include a receiver 158 that may include the electronic dispersion compensation module 120 and the bit error rate module 124. The receiver 158 may form part of a transceiver, if desired. In further detail, the receiver 158 may include the electronic dispersion compensation module 120 and a clock and data recovery (CDR) module 160, such as a clock and data recovery (CDR) circuit. The clock and data recovery circuit may be implemented in a single chip, multiple chips, one or more other suitable structures or any combination thereof. The clock and data recovery (CDR) module 160 may include the bit error rate module 124, a data recovery portion 162, a clock 164, other components or any combination thereof.

As shown in FIG. 9, the electronic dispersion compensation module 120 may receive the signal 126 and may apply one or more electronic dispersion compensation solutions to the signal 126 to create a signal 128. The data recovery portion 162 may receive the signal 128 and may use the clock 164 to process the signal 128 to create the signal 166. In one embodiment, at the block 132 shown in FIG. 6, the bit error rate module 124 shown in FIG. 9 may receive a bit sequence via the signal 166 and may, at the block 134 shown in FIG. 6, calculate a bit error rate using the bit sequence. In another embodiment, at the block 132 shown in FIG. 6, the bit error rate module 124 shown in FIG. 9 may receive a bit sequence via the signal 128 and may, at the block 134 shown in FIG. 6, calculate a bit error rate using the bit sequence. In one embodiment, the electronic dispersion compensation module 120 shown in FIG. 9 may include the bit error rate module 124, which may receive a bit sequence via the signal 166 and may calculate a bit error rate using the bit sequence.

Figure 10:
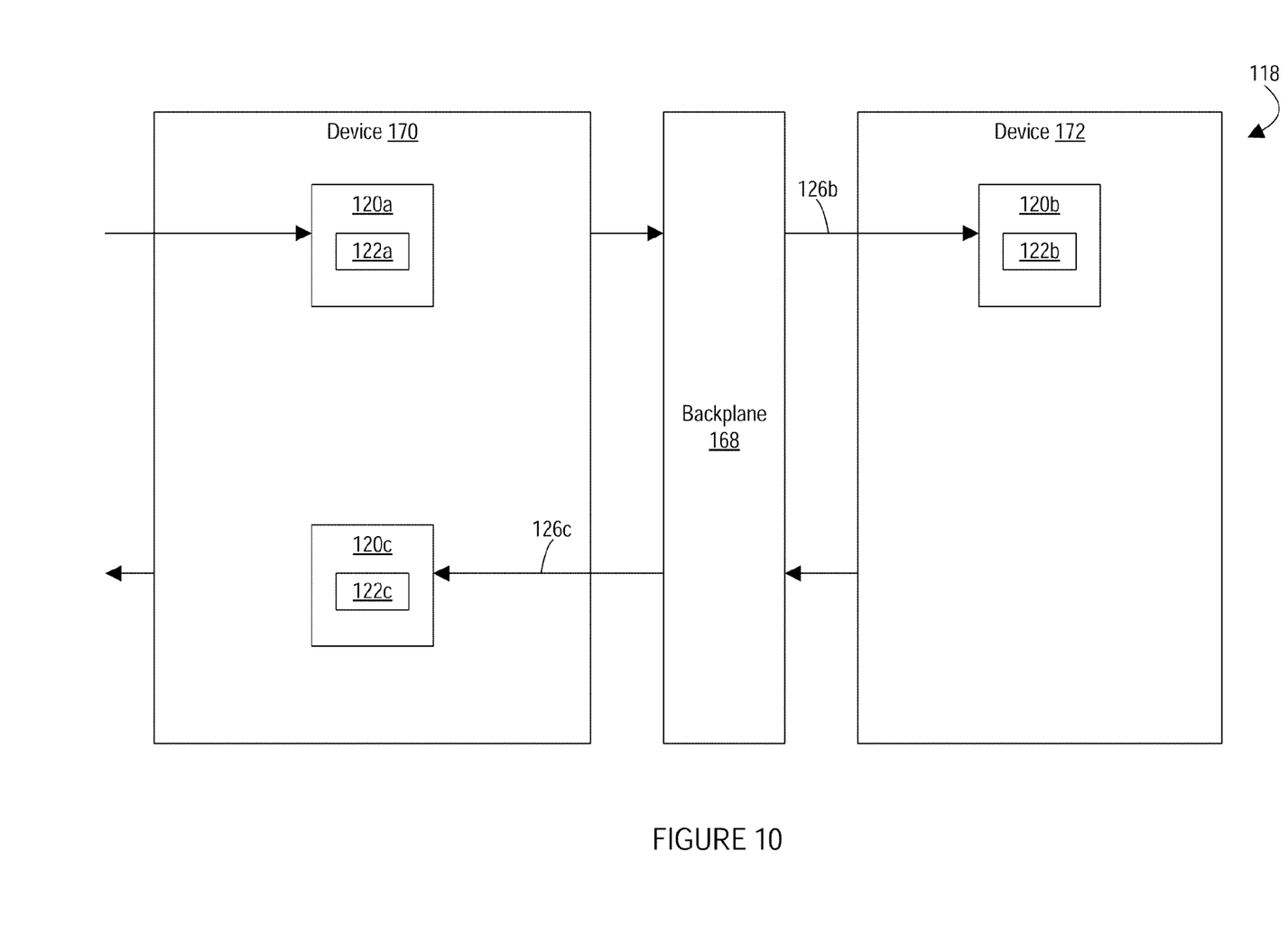
FIG. 10 is a diagram of still another exemplary electronic dispersion compensation system.

As shown in FIG. 10, the electronic dispersion compensation system 118 may include a printed circuit board, such as a backplane 168, and one or more devices 170, 172 that may communicate via the printed circuit board. Desirably, the devices 170, 172 may respectively include electronic dispersion compensation modules 120, which may facilitate such communication. For example, the device 170 may include an electronic dispersion compensation module 120*c* that may apply electronic dispersion compensation solutions to the signal 126*c* that the device 170 receives via the backplane 168, and the device 172 may include an electronic dispersion compensation module 120*b* that may apply electronic dispersion compensation solutions to the signal 126*b* that the device 172 receives via the backplane 168. The signals 126 that the devices 170, 172 receive via backplane 168 are preferably electronic signals; however, these signals may be any other suitable signal. In some embodiments, the device 170 may include a receiver that may include an electronic dispersion compensation module 120a, and the device 170 may be a transceiver that includes the receiver, if desired.

Figure 11:
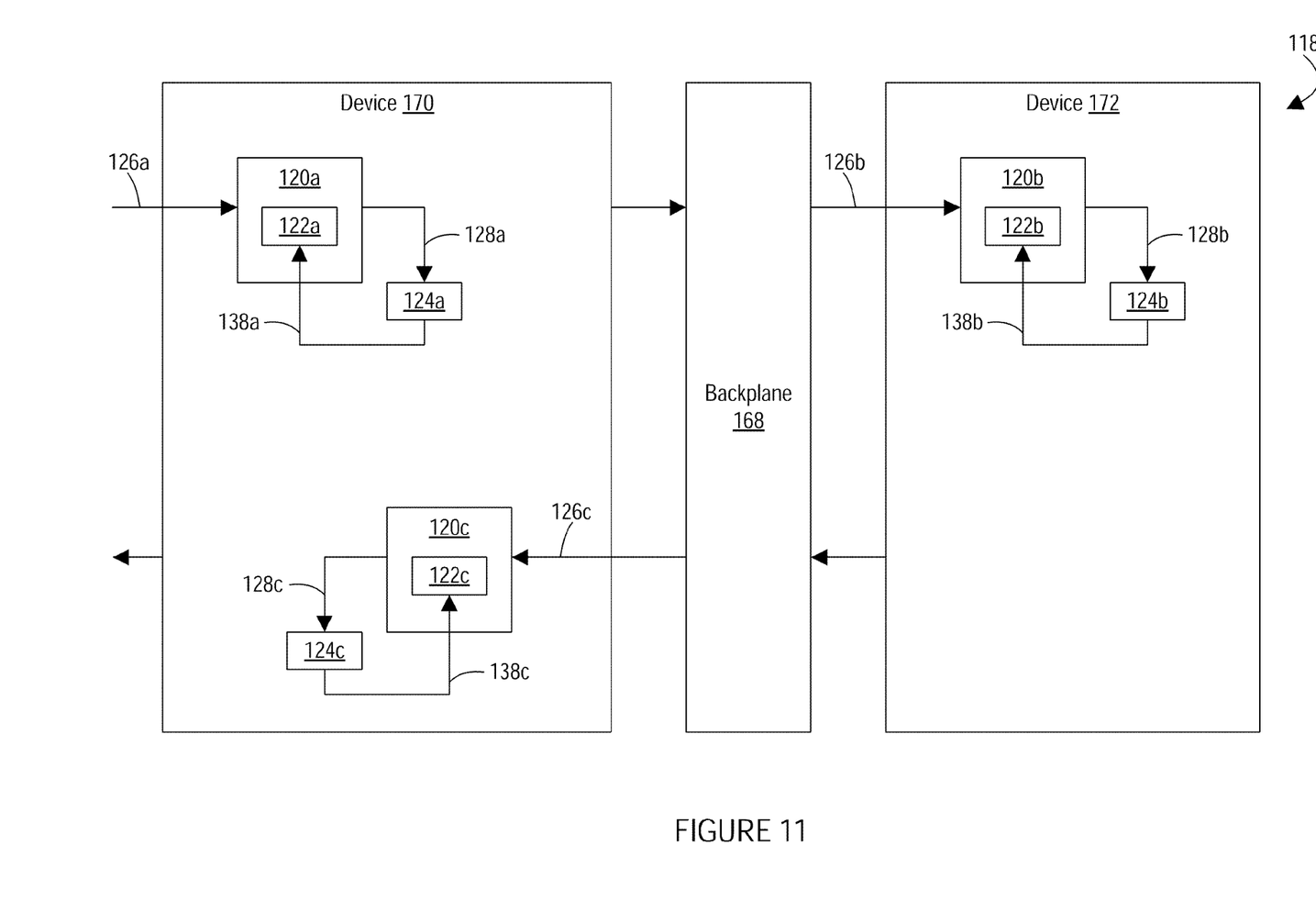
FIG. 11 is a diagram of another exemplary electronic dispersion compensation system.
Figure 12:
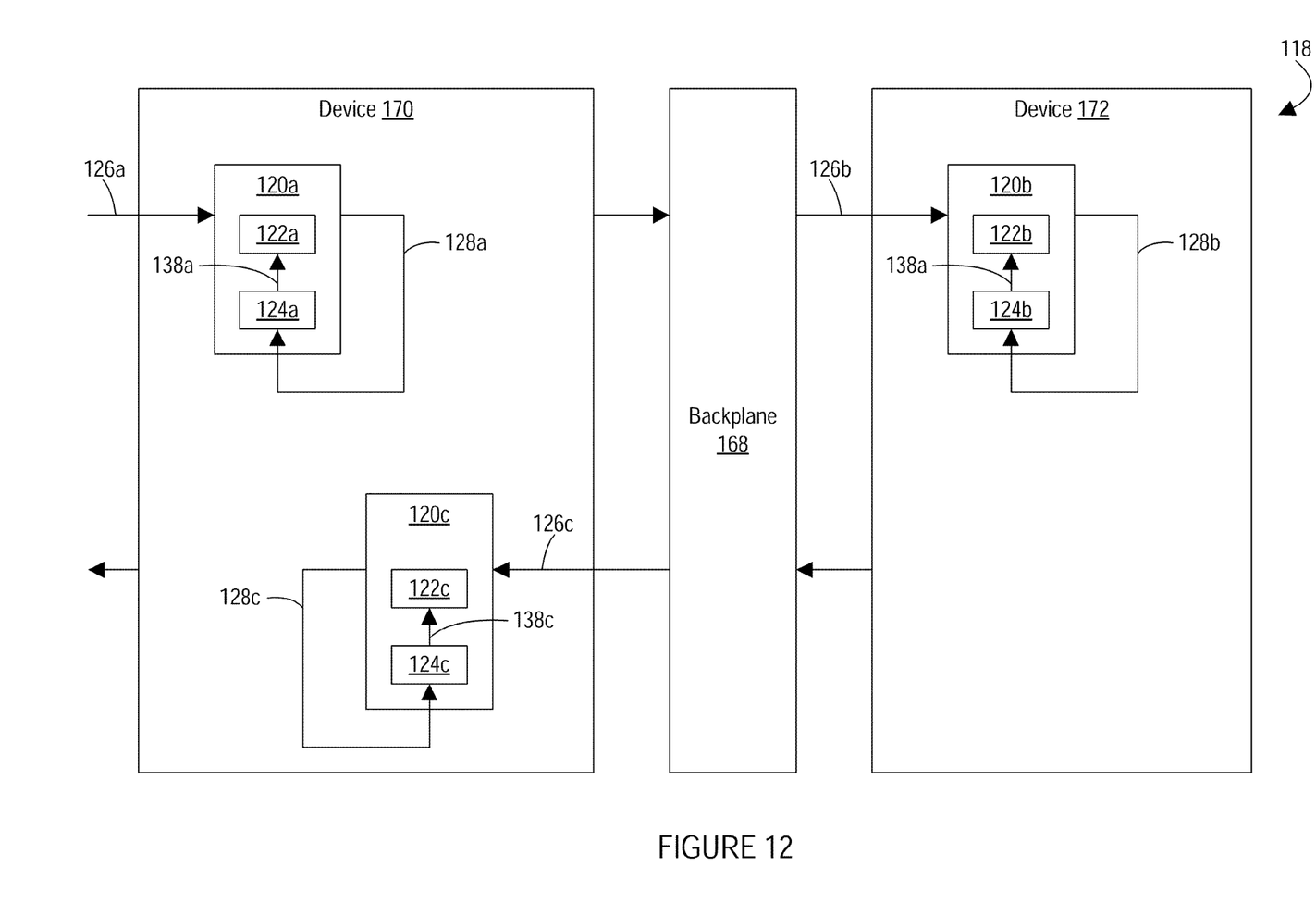
FIG. 12 is a diagram of yet another exemplary electronic dispersion compensation system.
Figure 13:
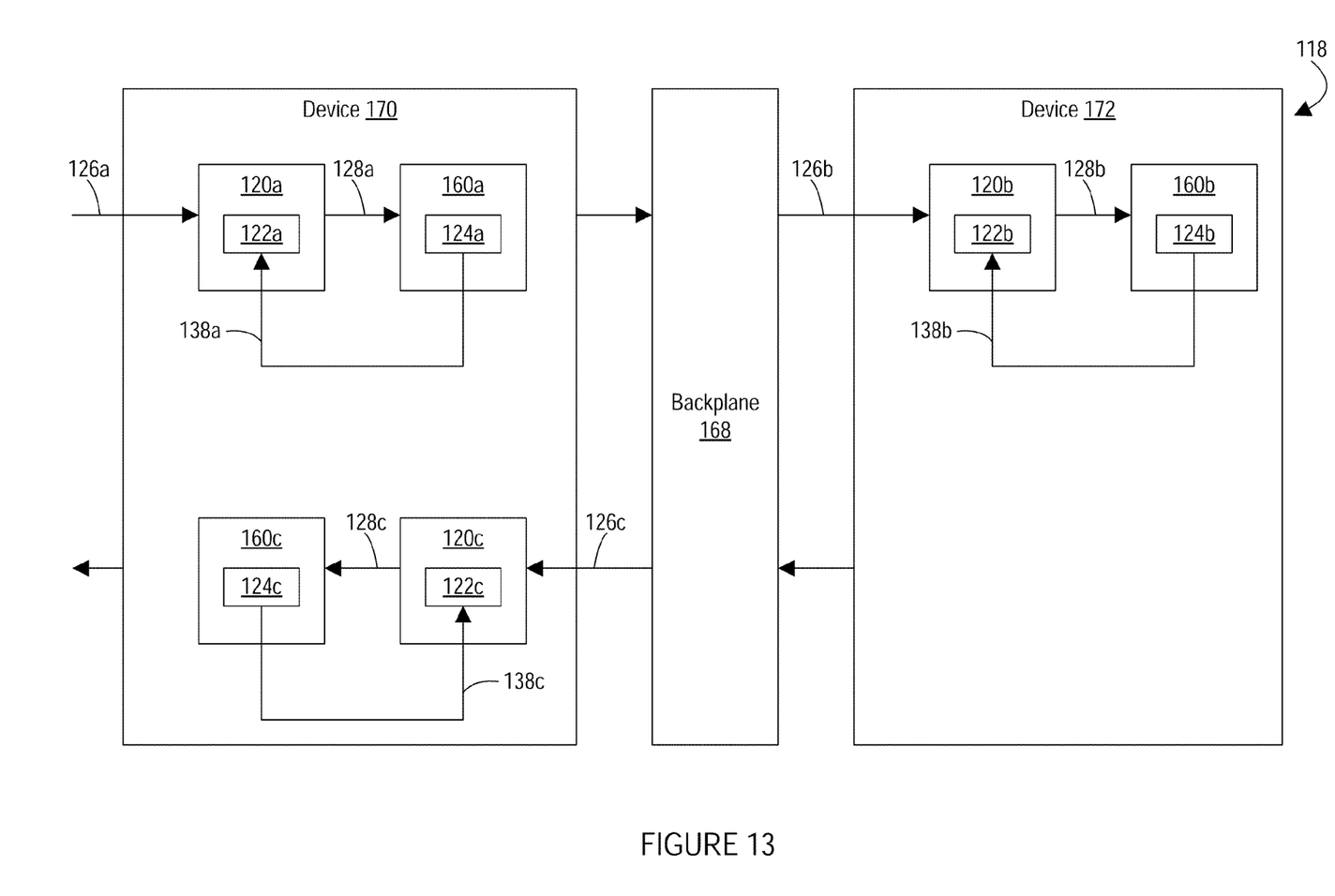
FIG. 13 is a diagram of still another exemplary electronic dispersion compensation system.

As shown in FIGS. 11-13, the devices 170, 172 may include one or more bit error rate modules 124, which may send data indicating a bit error rate to one or more solution control modules 122 via, for example, signals 138. The bit error rate modules 124 may be implemented as part of the electronic dispersion compensation modules 120 as shown in FIG. 12. The bit error rate modules 124, however, may be implemented separate from the electronic dispersion compensation modules 120, for instance as shown in FIGS. 11 and 13. As shown in FIG. 13, the devices 170, 172 may include clock and data recovery modules 160 that may include the bit error rate modules 124.

As shown in FIGS. 5 and 8-13, the signals 126, 128 and 138 preferably transmit time-ordered bit sequences, such as serial data streams comprising bit sequences. It will be appreciated that the signals 126, 128 and 138 may transmit other types of data comprising bit sequences.

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic dispersion compensation system comprising:
  an electronic dispersion compensation module configured to receive a first data stream and perform a first electronic dispersion compensation solution on the first data stream to generate a second data stream;
  a clock and data recovery module including a data recovery portion, the data recovery portion configured to receive the second data stream, to generate a third data stream based on the second data stream using a clock, and to output the third data stream external to the clock and data recovery module; and
  a bit error rate module included in the clock and data recovery module and configured to generate first data indicating a bit error rate, the bit error rate module configured to dynamically calculate the bit error rate based on a portion of the second data stream, a portion of the third data stream, and a clock signal as input,
  wherein the electronic dispersion compensation module includes a solution control module configured to receive the first data indicating the bit error rate and to use the first data indicating the bit error rate in determining whether to configure the electronic dispersion compensation module to perform a second electronic dispersion compensation solution on the first data stream.

2. The electronic dispersion compensation system as in claim 1, wherein the clock and data recovery module and the electronic dispersion compensation module are embodied in a printed circuit board.

3. The electronic dispersion compensation system as in claim 1, further comprising a transceiver that includes the electronic dispersion compensation module.

4. An electronic dispersion compensation system comprising:
  an electronic dispersion compensation module configured to receive a first data stream and perform a first electronic dispersion compensation solution on the first data stream to generate a second data stream, the electronic dispersion compensation module including:

a solution control module configured to receive first data and to use the first data in determining whether to configure the electronic dispersion compensation module to perform a second electronic dispersion compensation solution on the first data stream, the first data indicating a bit error rate, the first data being created by a bit error rate module of a clock and data recovery module, the clock and data recovery module including a data recovery portion, the data recovery portion configured to receive the second data stream, to generate a third data stream based on the second data stream using a clock, and to output the third data stream external to the clock and data recovery module, the bit error rate module configured to dynamically calculate the bit error rate based on a portion of the second data stream, a portion of the third data signal, and a clock signal as input.

5. The electronic dispersion compensation system as in claim 4, wherein the clock and data recovery module is embodied in a first chip; and wherein the electronic dispersion compensation module is embodied in a second chip.

6. The electronic dispersion compensation system as in claim 4, wherein the clock and data recovery module and the electronic dispersion compensation module are embodied in a printed circuit board.

7. The electronic dispersion compensation system as in claim 4, further comprising a receiver that includes the electronic dispersion compensation module.

8. An electronic dispersion compensation system comprising:
a clock and data recovery module including a data recovery portion configured to receive a compensated data stream generated by an electronic dispersion compensation module performing a first electronic dispersion compensation solution on an input data stream, the data recovery portion further configured to generate a recovered data stream based on the compensated data stream using a clock and to output the recovered data stream external to the clock and data recovery module, the clock and data recovery module further including a bit error rate module configured to create first data indicating a bit error rate, the bit error rate module configured to dynamically calculate the bit error rate based on a clock signal, a portion of the recovered data stream, and a portion of the compensated data stream, the clock and data recovery module being configured to send the first data indicating the bit error rate to the electronic dispersion compensation module, the electronic dispersion compensation module including a solution control module configured to receive the first data indicating the bit error rate and to use the first data indicating the bit error rate in determining whether to configure the electronic dispersion compensation module to perform a second electronic dispersion compensation solution on the input data stream.

9. The electronic dispersion compensation system as in claim 8, wherein the clock and data recovery module is embodied in a first chip; and wherein the electronic dispersion compensation module is embodied in a second chip.

10. The electronic dispersion compensation system as in claim 8, wherein the clock and data recovery module and the electronic dispersion compensation module are embodied in a printed circuit board.

11. The electronic dispersion compensation system as in claim 8, further comprising a receiver that includes the electronic dispersion compensation module.

12. The electronic dispersion compensation system as in claim 8, further comprising a transceiver that includes the electronic dispersion compensation module.

13. An electronic dispersion compensation system comprising:
an electronic dispersion compensation module configured to receive a first data stream from a backplane and to apply any of a plurality of electronic dispersion compensation solutions to the first data stream to generate a second data stream;
a clock and data recovery module including a data recovery portion, the data recovery portion configured to receive the second data stream, to generate a third data stream based on the second data stream using a clock, and to output the third data stream external to the clock and data recovery module; and
a bit error rate module included in the clock and data recovery module and configured to create first data indicating a bit error rate, the bit error rate module configured to dynamically calculate the bit error rate based on a clock signal, a portion of the third data stream, and a portion of the second data stream,
wherein the electronic dispersion compensation module includes a solution control module configured to receive the first data indicating the bit error rate and to use the first data indicating the bit error rate in determining whether to configure the electronic dispersion compensation module to switch from applying a first electronic dispersion compensation solution to the first data stream to applying a second electronic dispersion compensation solution to the first data stream.

14. The electronic dispersion compensation system as in claim 13, further comprising the backplane.

15. The electronic dispersion compensation system as in claim 13, further comprising a receiver that includes the electronic dispersion compensation module.

16. The electronic dispersion compensation system as in claim 13, further comprising a transceiver that includes the electronic dispersion compensation module.

17. The electronic dispersion compensation system as in claim 1, wherein the second data stream comprises a serial bit sequence and the bit error rate module is configured to receive the serial bit sequence and create the first data indicating the bit error rate of the serial bit sequence, the serial bit sequence having an algorithmically-defined pattern of one or more bits that are sent at regular intervals.

18. The electronic dispersion compensation system as in claim 17, wherein the serial bit sequence has "66-64" coding.

19. The electronic dispersion compensation system of claim 1, wherein the first electronic dispersion compensation solution and the second electronic dispersion compensation solution are selected from a set of available electronic dispersion compensation solutions.

20. The electronic dispersion compensation system of claim 1, wherein the bit error rate indicated by the first data is associated with a particular electronic dispersion compensation solution included in a set of available electronic dispersion compensation solutions, and the solution control module selects the second electronic dispersion compensation solution from the set of available electronic dispersion compensation solutions based on the bit error rate.

* * * * *